United States Patent Office 3,795,574
Patented Mar. 5, 1974

3,795,574
IMPREGNATION OF WOOD WITH A FORMALDE-
HYDE FREE ALKALINE SOLUTION OF SODIUM
HYDROXIDE AT A pH BETWEEN 12.4 AND 13
John Hans Kalisch, George Tombler, Fernand Guy
Hurtubise, and Jordan Kopanidis, Hawkesbury,
Ontario, Canada, assignors to Canadian International
Paper Company, Montreal, Quebec, Canada
No Drawing. Continuation-in-part of abandoned application Ser. No. 762,578, Sept. 25, 1968. This application July 27, 1971, Ser. No. 166,631
Int. Cl. D21c 3/26
U.S. Cl. 162—86                                7 Claims

ABSTRACT OF THE DISCLOSURE

A process involving impregnation of wood with a formaldehyde free alkaline solution containing sodium hydroxide at a pH of from about 12.4 to about 13 and sodium sulfite at temperatures below 80°C., followed by draining the solution, adding sulfur dioxide and cooking the wood in accordance with the bisulfite process to produce increased yields of pulp having high unbleached brightness.

---

This application is a continuation-in-part of application Ser. No. 762,578, filed Sept. 25, 1968, now abandonded.

This invention relates to a wood pulping process for making paper pulps of improved unbleached brightness, increased yield, and other improved pulp characteristics.

A great deal of research work has been carried out which relates to the use of an alkaline solution containing a low concentration of formaldehyde before cooking wood by the sulfite process. The use of this process is highly advantageous for coniferous woods and particularly, for woods such as pines in which the polyphenolic components interfere with normal pulping by the sulfite process. The sulfite process is discussed at length in, for instance, Calkin, J. B.: Modern Pulp and Paper Making; (3rd ed.) Reinhold Publishing Corporation; N.Y., 1957; p. 81 et seq.

Many attempts have been made in the past to arrive at a satisfactory process for pulping of pines by the sulfite process. The use of soluble bases such as sodium, magnesium, and ammonium has led to substantial improvements over calcium base cooking. Pine chips from young trees can be successfully cooked by the conventional calcium base sulfite process, but difficulties increase with the age of the tree. The need to harvest relatively older trees from slower growing northern pines in contrast to fast growing southern pines indicates the problem.

It has been shown that the heartwood portion of pines is responsible for their more difficult pulping characteristics; sapwood, on the other hand pulps satisfactorily with any base by the sulfite process. Consequently, the relatively high proportion of heartwood in slow growing trees of normal age for harvesting eliminates the use of calcium base in conventional sulfite cooking.

However, even the use of a soluble base in pulping of pines will result in pulp characteristics inferior to those of spruce and other coniferous woods of relatively low resin content. This is particularly apparent with reference to delignification (yield at comparable "Roe chlorine number") and unbleached pulp brightness.

Hägglund (Cellulose Chemie 8 (No. 3) 25 (1927)) and more recently Erdtmann (Tappi 23, 303 (1949)) have shown that an ether-, benzene-insoluble, but alcohol- or acetone-soluble compound contained in the heartwood of pines interferes with normal delignification in lime base sulfite cooking. Such compounds were identified by Erdtmann as resorcinol-like polyphenols such as pinosylvin, pinosylvin methyl ether, and flavanones which amounts to about 20% of the total resin of pine or to approximately 1% of the heartwood portion of pine. Polyphenols condense easily with lignin at higher temperature. As a result, large lignin-polyphenol complexes are formed with simultaneous blocking of active groups which are needed for sulfonation and final solubilization of the lignin.

Blocking of the reactive position of the polyphenol prior to the start of the sulfite cook is needed to prevent condensation with lignin. Experiments by Adler and Stockman (Svensk Papperst. 54,477 (1951)) with phenolic model compounds (catechol) indicated that such a reaction will occur with formaldehyde in an alkaline medium so that a hydroxybenzyl alcohol is formed according to the Lederer-Manasse reaction. This hydroxybenzyl alcohol reacts with sulfite and forms a hydroxybenzyl sulfonic acid. The following illustrates the above-mentioned reactions:

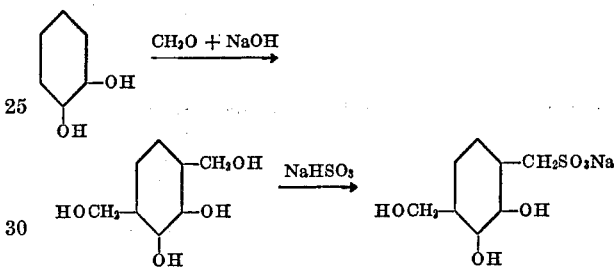

The above-noted investigators attempted to apply their concept to sulfite pulping of pine heartwood by pretreating it with a relatively concentrated solution of formaldehyde (20% concentration) in an alkaline (0.1 N NaOH) or aqueous solution at elevated temperature (80° C.) for six hours. Pulp made by this procedure showed greatly improved yield, but was still not satisfactory owing to low brightness (discoloration) as well as shiviness.

A process overcoming the deficiencies in the treatments just discussed is described in co-pending U.S. application No. 539,683 of Apr. 4, 1966, now U.S. Pat. 3,479,249. This process is based on the discovery that in contrast to previously described findings, considerable improvements in pulping not only of pines, but also other coniferous woods such as spruce, occur if the pretreatment of the pine chips is carried out both at a low temperature and at a low concentration of formaldehyde in alkali. Impregnation temperature preferably below 50° C. and formaldehyde concentration between 0.15 and 0.4 percent, corresponding to 0.75% to 2.0% (added) by weight based on wood at an alkali solution-to-wood ratio of 5:1 by weight, result in highly significant improvements.

The low formaldehyde concentration and the low impregnation temperature promote the reaction of pinosylvin and other polyphenolic compounds according to the Lederer-Manasse reaction and substantially slow or prevent the otherwise competing, but undesired lignin-formaldehyde condensation, which proceeds disadvantageously at an increased speed at a higher concentration of formaldehyde and at a higher temperature.

Experimental results on jack pine (Pinus banksiana) presented in the above application show that unbleached pulp yield, brightness, and viscosity are increased by the alkaline formaldehyde pretreatment, reaching maxima between 2 and 4 percent formaldehyde. All these properties decrease as temperature is increased above 40–50° C.

Jack pine pulp made with alkaline formaldehyde pretreatment, in comparison with a conventional soda base sulfite pulp, shows 9 points gain in brightness and a 5% actual gain in screened pulp yield. Corresponding gains for block spruce pulp made with pretreatment are a 7 point gain in brightness and 6% actual increase in screened pulp yield. Douglas fir showed a 3% higher actual yield and 12.5 point gain in brightness in comparison with the corresponding sulfite pulp. Other properties, such as high viscosity and high mannan content, reflect the unique characteristics of pulps from alkali-formaldehyde pretreated wood.

Paper strength tests of pulps made with alkaline formaldehyde pretreatment showed that they are equal to conventional sulfite pulps at a freeness of 300 CSF, but surpass them at a freeness of 100 CSF. Consequently, such pulps make very satisfactory paper pulps both for unbleached and bleached grades, but are particularly suitable for glassine type pulps as a result of fast beating and good retention of strength in beating to low freeness.

It was subsequently found that the alkaline formaldehyde pretreatment gives similar or even greater advantages when used in connection with the bisulfite cooking process, so called because base and sulfur dioxide are present in the stoichiometrical proportions to give only the bisulfite, without excess of either constituent. Such a process is disclosed in copending U.S. application No. 734,044 of June 3, 1968, now U.S. Pat. No. 3,617,435. The description of the process which follows up to and including Examples I through VI, refers to and describes the process disclosed in said application Ser. No. 734,044.

In this proces, cooking conditions are obtained by treating NaOH-CH$_2$O impregnated chips with an aqueous sulfurous acid solution which contains the amount of SO$_2$ required to produce sodium bisulfite instead of the free-SO$_2$-containing sodium acid sulfite liquor. Instead of the aqueous solution, liquid SO$_2$ may be employed, the choice depending largely on local availability. Bisulfite is formed stoichiometrically according to the following equation:

$$NaOH + SO_2 + H_2O \rightarrow NaHSO_3 + H_2O \qquad (1)$$

This reaction should lead to pH 4. However, in practice it has been found that the actual quantity of SO$_2$ should be about 2 to 8% less than the theoretically calculated one. This has been found desirable in order to prevent a substantial lowering in pH below the bisulfite range, resulting from wood acids produced during cooking.

The general procedure is as follows:

A blend of balsam-spruce chips is treated with a sodium hydroxide solution containing a small quantity of formaldehyde. The liquor is drained after the required time of impregnation. The amount of NaOH taken up by the chips is determined by measuring both volumes and NaOH contents of the fresh liquor added and the drained liquor recovered. The amount of SO$_2$ required to form bisulfite is calculated less 6% based on Equation 1 and a sulfurous acid solution containing the required quantity of SO$_2$ is injected into the digester. A cold pH preferably between 3 and 4 will be reached after a few hours of cooking.

The time-temperature cooking chart is designed to allow for ample diffusion time of chemicals from the outside of the chips towards the center and vice versa before a substantial temperature rise occurs.

The following illustrates the above.

EXAMPLE 1

Wood: Balsam-spruce mill chips (10,500 g. oven-dry weight).

Caustic impregnation (liquor):
  NaOH: 50 grams/liter
  CH$_2$O: 4 grams/liter
  Volume added: 54 Liters
  Temperature: 25° C.
  Liquor to wood ratio: 5.1:1
  Pressure: 100 p.s.i.
  NaOH take-up: 1167 g.
Bisulfite cook (liquor):
  Sulfurous acid: 4.12% SO$_2$
  Volume added: 44.4 liters
  So$_2$ content: 1835 grams [1]
  pH: 3.5
  Liquor to wood ratio: 4.2
  Maximum cooking temp.: 155° C.
  Pressure: 85 p.s.i.g. (constant from start to finish)

[1] 30 grams less than that required for complete formation of NaHSO$_3$.

COOKING CHART

| | | | | | | | | | | |
|---|---|---|---|---|---|---|---|---|---|---|
| Time, hours | 0 | 1 | 2 | 3 | 4 | 5 | 6 | 7 | 8 | 8½ |
| Temperature, °C | 25 | 40 | 50 | 90 | 125 | 155 | 155 | 155 | 155 | 155 |
| Pressure, p.s.i.g. | 85 | | | | | | | | | |
| Total SO$_2$, percent | 3.06 | 2.85 | 2.7 | 2.6 | 2.58 | 2.10 | 1.54 | 1.06 | 0.76 | 0.66 |
| Combined SO$_2$, percent | 0.96 | 1.16 | 1.2 | 1.19 | 1.18 | 0.9 | 0.64 | 0.46 | 0.32 | 0.28 |
| Cold pH | 2.1 | 2.5 | 2.56 | 2.70 | 2.75 | 2.90 | 3.10 | 3.40 | 3.5 | 3.45 |

It should be understood that the above cooking data illustrate one example only. However, other variations of this procedure such as, for instance, caustic impregnation with lower concentration of NaOH and CH$_2$O also produce satisfactory results. Furthermore, other caustic impregnation media including the strongly alkaline carbonates of such bases or a combination of carbonates with alkalies are within the scope of this invention, and indeed have certain advantages which will be discussed later.

It should be noted that high yield pulps were obtained by the pretreatment-bisulfite process as screenable pulps without the need of mechanical refining. In contrast, the conventional bisulfite pulps had to be mechanically refined.

Advantages of pulps made with the alkaline pretreatment over conventional bisulfite are the following:
  (1) Screened pulp yields of about 60% without mechanical refining. This is due to better delignification and higher retention of hemicelluloses;
  (2) Pulps at yields above 60% and up to 75% can be obtained by mild refining in a single-pass operation;
  (3) Considerably higher unbleached brightness;
  (4) Good strength characteristics except somewhat lower tear and opacity.

The new pulps made with the alkaline pretreatment are particularly valuable as a replacement for ordinary unbleached sulfite pulps, whenever higher brightness and high screened yield and good beatability are desired, as in newsprint or publication grade papers.

Replacement of NaOH with Na$_2$CO$_3$ of preferably a combination of Na$_2$CO$_3$ with NaOH in the impregnation stage contributed to further significant improvements in delignification, paper strength characteristics and also brightness of AFB pulps The following example describes the cooking procedure and pulp data:

EXAMPLE 2

Conventional spruce-balsam mill chips were impregnated with a solution of 80 g. Na$_2$CO$_3$, 11 g. NaOH and 2.8 g. CH$_2$O per liter, at RT and 100 p.s.i. for 90 minutes at a liquor to wood ratio of 5:1. Three pressure cycles of 1 minute each were applied to improve liquor penetration. The liquor was then drained and an aqueous SO$_2$ solution was injected, containing the amount of SO$_2$ necessary to convert the base into sodium bisulfite according to the following reactions:

(I) $Na_2CO_3(NaOH) + SO_2(H_2O) \rightarrow NaHSO_3 + NaHCO_3$ (II)    $NaHCO_3 + SO_2 \rightarrow NaHSO_3 + CO_2$ Cooking was carried out according to the following chart for a total time of 6 hours, 5 minutes:

| Time, hours | 0 | 1 | 2 | 3 | 4 | 5 | 6 |
|---|---|---|---|---|---|---|---|
| Temperature, °C | RT | 40 | 50 | 90 | 125 | 150 | 155 |
| Pressure | 90 | 90 | 85 | 110 | 90 | 90 | 90 |

The liquor to wood ratio was 4:1 using a full digester and maintaining 90 p.s.i. throughout the cook. The cooked chips were given a mild mechanical refining treatment. The above conditions produced the following pulp:

| | |
|---|---|
| Pulp yield, percent | 72.2 |
| Brightness, percent (Elr.) | 59 |
| Kappa number | 95 |
| Roe number | 21.4 |
| Strength (PFI Mill) at 500 CSF: | |
| Mullen, percent pts./lb. | 140 |
| Tensile strength, m. | 12,500 |
| Tear factor | 70 |
| Fold (Schopper) | 210 |
| Opacity, percent | 64 |

The following table shows pulp data for the two modifications of the alkaline pretreatment process and comparative data for a conventional sodium bisulfite control cook. All data were extrapolated to 75% pulp yield for easier comparison:

| | Pulp yield 75% | | |
|---|---|---|---|
| | Alkaline pretreatment | | Conventional, bisulfite |
| | $Na_2CO_3$ + NaOH, 2.8 g./l $CH_2O$ | NaOH, 4 g./l $CH_2O$ | |
| Pulp data: | | | |
| Roe number | 23.9 | 26.0 | 31.0 |
| Brightness, percent (Elr.) | 60.0 | 58.5 | 56 |
| PFI strength at 500 CSF: | | | |
| Mullen, percent pts./lb. | 143 | 124 | 140 |
| Breaking length, m. | 12,500 | 10,300 | 11,800 |
| Tear factor | 67 | 63 | 63 |
| Mannan, percent | 15.7 | 13.7 | 11.8 |

FIGS. 1, 2 and 3 give the same comparison for Roe number, brightness, and breaking length over a range of pulp yields.

The reaction between carbonate and also hydroxide with $SO_2$ proceeds primarily within the chip. The pH gradually decreases, $CO_2$ being generated until the formation of sodium bisulfite is completed. The initial pH during caustic impregnation is 12.5; however, decomposition of the carbonate starts below pH 8.5. Theoretically, for each mole (106 grams) of $Na_2CO_3$ one mole of $CO_2$ (44 grams or 22.4 liters at 0° C., 760 mm.) is formed. The solubility of $CO_2$ in water at a pressure of 80 p.s.i. and 30° C. is 0.4 gram $CO_2$/100 ml. $H_2O$. This will lower pH to 3.5. Therefore, this system containing excess $CO_2$ and carbonic acid is in a position to exert effectively within the chip a buffering action and perhaps also other not yet completely understood reactions during the initial stages of the bisulfite cook. It is suggested that the above indicated effects are a contributing or even major factor in the striking improvement in pulp characteristics.

Successful operation of this process with minimum darkening of the wood chips requires substantially complete impregnation by the alkaline pretreatment liquor at low temperature, preferably not above 50° C., and conversion of the liquor within the chips from alkaline to acid state before temperature is raised to the cooking range (ca. 155° C.). It was found that these requirements could be satisfied in times short enough to permit continuous operation by conducting the impregnation at pressures of 200 p.s.i. or above, and a process based on this finding is described in the above-mentioned U.S. application No. 734,044, filed June 3, 1968.

The following is a description of some of the principal features of the above referred to process.

Mill chips such as jack pine, spruce, balsam or blends are pretreated with an alkaline solution containing a mixture of sodium hydroxide, sodium carbonate, and formaldehyde, total $Na_2O$ content 55 grams per liter, the proportion of carbonate being such that the $CO_2$ liberated during the subsequent acidification step will assist in holding the pressure at the level of the impregnation step, i.e. about 200 p.s.i.g. or above, while avoiding an excess of $CO_2$ which would have to be goten rid of.

The composition of the caustic impregnation liquor must be adjusted in such a way that the combined strength of $Na_2CO_3$ and NaOH is sufficient to result in a minimum take up of about 10% $Na_2O$ on wood. The concentration of NaOH in the $Na_2CO_3$-containing liquor must be adequate to obtain a minimum pH of 12.6.

For practical application, 80 to 100 grams $Na_2CO_3$ per liter and 11 to 5 grams NaOH per liter will satisfy the above requirements and also insure the desired pressures from the beginning of the cook. Lower amounts of $Na_2CO_3$ and correspondingly higher levels of NaOH can be used as long as the desired level of $Na_2O$ on wood an the required pressure buildup is obtained.

If the carbonate content is reduced below a level necessary to liberate sufficient $CO_2$ to maintain the pressure required for quick conversion to sulfite after the impregnation stage, other means of pressure generation must be provided. Continuous pulping with two sequential stages prevents the use of a full digester which would be necessary for the use of a booster pump to maintain pressure. However, adequate pressure can be easily and cheaply maintained by, for instance, an oil-burning inert gas generator-compressor combination as commonly used for inert gas padding. But it should be kept in mind that, aside from pressurizing, carbonate has a beneficial effect on pulp properties, as described previously:

The level of formaldehyde in the impregnation liquor chosen will depend on the wood species used. Woods containing objectionable resins such as jack pine, will require between 1 and 2 grams of $CH_2O$ (100%) per liter. On the other hand, less refractory woods such as balsam and spruce or blends can be adequately treated with liquors containing 0.25 to 0.5 g. $CH_2O$ per liter. In making some pulp grades from these more readily pulped woods the addition of even this small amount may not be economically justified; this will have to be decided by the requirements of the particular pulp grade and the current price of formaldehyde.

The above impregnation liquor is applied at a liquor-to-wood ratio of 5 to 1 by weight and at a temperature between 20° C. and 50° C. and a pH of 12.8. The wood chips in the liquor are subjected to a hydrostatic pressure between 200 and 300 p.s.i.g. for 2 to 15 minutes. The impregnation liquor is then drained and made up to strength with $Na_2CO_3$ and NaOH (and $CH_2O$) for reuse in the next cook. After draining of the alkaline solution, water and liquid sulfur dioxide or an aqueous solution of sulfur dioxide is injected, so that a liquor to wood ratio of 4.5 to 1 is obtained. The temperature is then increased within 1 to 2 minutes to between 50 and a maximum of 100° C. The required quantity of sulfur dioxide is calculated to convert the alkali taken up by the wood into sodium bisulfite. Liberation of carbon dioxide from the ensuing reaction between $Na_2CO_3$ and $SO_2$ in the digester is regulated by pressure relief in such a manner as to maintain a constant pressure of at least 200 p.s.i.g. throughout the cook. As mentioned above, the required pressure may be obtained in whole or in part from a compressor-inert gas generator combination.

The following cooking chart is used:

| Time, minutes | 0 | 3 | 63 | 83 |
|---|---|---|---|---|
| Temp., °C | 20–50 | 100 | 100 | [1]155 |
| Pressure, p.s.i.g | 200 | 200 | 200 | [1]200 |

[1] Maximum.

Total cooking times vary between 2 and 3 hours depending on the desired Roe number or pulp yield.

It should also be mentioned that the above process can be carried out as a full or partial vapor phase (trickle phase) process with all its inherent advantages owing to savings in steam and a further reduction in cooking time. In this case, only liquid $SO_2$ and steam are admitted into the digester.

The above described methods are particularly suitable for high yield semichemical pulping of softwoods, owing to their excellent fiberability, good uniformity and brightness, and high strength at pulp yields even above 70 percent. The above characteristics make this pulp a highly desirable component of groundwood furnishes for newsprint or for board making.

The outstanding fiberability characteristics of this pulp make it possible to obtain, without mechanical refining, high yield fully chemical pulps in a yield range between 61 and 65 percent.

The following examples are given:

EXAMPLE 3

(High yield, semichemical pulp)

Wood:
    White spruce (40%)
    Balsam (60%) 12.0 kg.
Impregnation liquor:
    $Na_2CO_3$, anhydr.: 80 g./l.
    NaOH: 11 g./l.
    $CH_2O$: 0.25 g./l.
Impregnation time:
    Min: 2
    Pressure, p.s.i.g.: 200
    Temperature: 40° C.
L:W (liquor:wood ratio) 5
pH 12.8
Chemical take up:
    $Na_2CO_3$: 1180 grams
    NaOH: 465 grams
    $CH_2O$: 15 grams The impregnation liquor was drained and an aqueous $SO_2$ solution containing 2145 grams of $SO_2$ was injected. The following heating schedule was applied:

| | Min. |
|---|---|
| Time to 100° C. | 3 |
| Time at 100° C. | 60 |
| Time to 155° C. | 20 |
| Time at 155° C. | 95 |
| Total time | 178 |
| pH after 1 hour | 2.3 |
| pH-maximum | 3 |

The pulp was refined in a disc refiner in a single pass at a plate clearance of 0.020 inch.

The following pulp characteristics were obtained:

| | |
|---|---|
| Pulp yield, percent | 75 |
| Brightness, percent, by Zeiss "Elrepho" Photometer | 56 |
| Roe number | 27.8 |
| Fiberability,[1] percent | 90 |

[1] Fiberability is based on a test comprising defibration for 45 seconds at 3% consistency, L-speed setting in a Waring Blendor, mod/CB–5, followed by screening on a Valley Iron 12 cut laboratory screen.

Strength properties at 500 CSF:

| | |
|---|---|
| Tear factor | 51 |
| Mullen, percent pts./lb. | 110 |
| Tensile strength, m. | 9600 |

A pulp of good brightness and exceptionally high fiberability was obtained. It should be mentioned that high fiberability and greater ease in mechanical refining are closely related. The strength properties of this pulp are comparable to conventional batch type (Alkaline pretreatment-Bisulfite cook) AFB pulps, with the exception of mullen which is somewhat lower.

EXAMPLE 4

(High yield semichemical pulp, lower proportion of NaOH in impregnation)

Wood:
    White spruce (40%)
    Balsam (60%) 3,500 grams
Impregnation liquor:
    $Na_2CO_3$, anhydr., g./l.: 95
    NaOH, g./l.: 5
Liquor to wood ratio: 5
Chemical take up:
    $Na_2CO_3$, grams: 588
    NaOH, grams: 52

The impregnation liquor was drained and an $SO_2$ solution containing 619 g. $SO_2$ was injected. The following heating schedule was applied:

| | Min. |
|---|---|
| Time to 100° C. | 2 |
| Time at 100° C. | 60 |
| Time to 155° C. | 10 |
| Time at 155° C. | 55 |
| Total cooking time | 127 |
| pH (cold) after 1 hr. | 2.5 |
| pH (cold) maximum | 2.9 |
| Pulp yield, percent | 73.0 |
| Brightness, (Elr.), percent | 69.3 |
| Fiberability, percent | 72.3 |
| Roe number | 25.3 |

Strength at 500 CSF:

| | |
|---|---|
| Tear factor | 52 |
| Mullen, percent pts./lb. | 147 |
| Tensile strength, m. | 11,600 |

The above cook was carried out with a lower proportion of NaOH. It should be noted that the decrease in NaOH content was accompanied by a decrease in fiberability. However, the cooked chips could still be refined in a single pass operation.

EXAMPLE 5

(High yield, fully chemical pulp)

Wood:
    White spruce (40%)
    Balsam (60%) 12.0 kg.

Impregnation liquor and impregnation conditions same as in Example 1, with the omission of formaldehyde.

Chemical take up:
    $Na_2CO_3$: 1760 grams
    NaOH: 453 grams

The impregnation liquor was drained and an aqueous $SO_2$ solution containing 2750 g. $SO_2$ was injected. The following heating schedule was applied:

| | |
|---|---|
| Time to 100° C., min. | 3 |
| Time at 100° C., min. | 60 |
| Time to 155° C., min. | 20 |
| Time at 155° C., min. | 107 |
| Total cooking time, min. | 190 |
| pH (cold) after 1 hour | 2.7 |
| pH (cold) maximum | 2.9 |

This pulp was in slush form after blowing the digester; no mechanical refining was required:

| | |
|---|---|
| Pulp yield, percent | 62 |
| Brightness, percent Elr. | 55 |
| Fiberability, percent | 99 |
| Roe number | 13 |
| Strength properties at 500 CSF: | |
| Tear factor | 47 |
| Mullen, percent pts./lb. | 137 |
| Tensile strength, m. | 12,000 |

It should be noted that screenable pulp was obtained at a yield of 62%. Only a "touch up" operation in refining was needed to break up a small amount of screening. In contrast, the screenable limit of conventional bisulfite pulp is in the neighborhood of 54 percent. A comparison of Examples 3 and 5 shows the relatively small effect of formaldehyde in the case of spruce-balsam, the principle effect being a small gain in brightness.

EXAMPLE 6

(High yield, semichemical pulp)

Wood: a blend of:
  Jack pine, percent: 15
  Balsam, percent: 51
  White spruce percent: 34
Impregnation liquor:
  $Na_2CO_3$, anhydr., g.: 80
  NaOH, g.: 11
  $CH_2O$, g./l.: 0.5–1.0

Impregnation and cooking conditions correspond to those described for Example 1, except for the higher level of formaldehyde.

| | |
|---|---|
| Pulp yield, percent | 78 |
| Brightness, percent Elr. | 56 |
| Roe number | 28 |
| Fiberability, percent | 77 |
| Strength properties at 500 CSF: | |
| Tear factor | 58 |
| Mullen, percent pts./lb. | 110 |
| Tensile strength, m. | 9,500 |

The above example shows that the use of fromaldehyde permitted the addition of jack pine to a balsam-spruce blend without detriment to pulp brightness and other properties. This is in contrast to an otherwise well known lowering in pulping characteristics resulting from an addition of jack pine.

The following table of comparative figures taken from the preceding examples shows the reduction in time for process steps effected by the increase in pressure. Figures illustrative of conventional bisulfite pulping are added for comparison.

| | Busulfite with alkaline pretreatment | | Conventional bisulfite |
|---|---|---|---|
| | Batch type | Continuous type | |
| Cooking stages: | | | |
| Alkali impregnation stage: | | | |
| Time, minutes | 90 | 2 | None |
| Pressure, max., p.s.i.g | 100 | 200 | |
| Bisulfite cooking stage: | | | |
| Time to max. temp., hrs. | 6:00 | 1:23 | 6:00 |
| Time at max. temp., hrs. | 0:30 | 1:00 | 0:40 |
| Pressure, max., p.s.i.g. | 100 | 200 | 85 |
| Temperature, max., °C | 155 | 155 | 160 |
| Total cooking time, hrs. | 8:00 | 2:25 | 6:40 |
| Pulp yield, percent | 73.0 | 73.4 | 73.2 |

The foregoing large reduction in cooking times makes it possible to obtain the previously described advantages of the AFB batch cooking process in a continuous pulping operation.

The advantages of the new AFB cooking procedure in comparison with the conventional sodium bisulfite (pH 4) cooking process is illustrated by improved fiberability and also by lower Roe numbers obtained over a wide yield range.

It has now been found that sulfite may be utilized as an alkaline buffering ion under a critical pH parameter to produce products which are comparable to those produced by the process disclosed in U.S. application Ser. No. 734,044.

Further studies have shown that the sulfite may under the conditions set forth be used as a substitute for some or all of the carbonate utilized in the prior process described above.

The sulfite may be added in the form of $Na_2SO_3$ as a component of the NaOH or NaOH and $Na_2CO_3$ impregnation liquors in an amount sufficient to produce a pH of between about 12.4 and about 13, this range of pH being critical for maximum stabilization and retention of the hemicelluloses contained in the starting material. Such retention of the hemicelluloses is essential to the high pulp yields which are the products of the present invention. The conditions of impregnation, as disclosed herein, do produce such maximum retention of the hemicelluloses.

Higher concentrations of sodium hydroxide produced unsatisfactory results. For instance, impregnation liquors containing 60 g./l. of NaOH as shown in Table I resulted in an effective pH of 14. According to the Handbook of Chemistry and Physics, Robert C. Weast, Ph.D., Chemical Rubber Co. page D–103 (1970), a concentration of 40 g./l. (1–N) of NaOH produces an effective pH of 14. Cooking following the above impregnation conditions produced pulps of lower brihtness, lower hemicellulose retention as illustrated by higher lignin at a given yield level, in comparison with our presently claimed conditions. Further increase in caustic concentration for impregnation would lead to mercerizing conditions which are characterized by a partially depolymerized, low viscosity, high alpha, low hemicellulose pulp. For example, the U.S. Pat. No. 1,848,662, Richter, discloses impregnation conditions of 100 to 180 g./l. and appropriate temperature conditions, which led to extensive mercerization of the product, as there desired.

In comparison pulps prepared according to this invention are of comparatively low alpha cellulose content but have a high hemicellulose content and are also of high solution viscosity. On the other hand as pH decreases below 12.5 the retention of hemicellulose decreases resulting in lower yields as the examples in Table II indicate.

The present invention therefore provides a process for making pulps of increased pulp yield, high unbleached brightness and high fiberability from coniferous wood, comprising impregnating the wood with an alkaline solution of NaOH at a pH of from about 12.4 to about 13 and containing sulfite ion as a buffer, at a temperature below about 80° C., and a pressure up to about 300 p.s.i.g., draining the solution from the wood, and adding sulfur dioxide so as to obtain a bisulfite cooking condition. The pH of the impregnation stage will normally lie in a preefrred range of 12.6 to 12.9. A pH of 12.9 has been found to be particularly suitable.

In a preferred embodiment, the present invention provides such a process wherein the alkaline impregnation stage is carried out at atmospheric pressure, the temperature does not exceed about 50° C., and the time of impregnation is 2 to 90 minutes.

In another aspect the present invention provides such a process wherein the pressure in the alkaline impregnation stage is an elevated pressure of at least about 200 p.s.i.g., the temperature does not exceed about 50° C., and the time of impregnation is about 3 minutes.

In another aspect, the present invention provides such a process wherein the bisulfite cooking condition is carried out continuously in full or in partial vapor phase in a digester, by introduction of liquid sulfur dioxide and steam into the digester.

It has been found that the process of the present application may be conducted by either batch or continuous operation. The sulfur dioxide will normally be chosen from the group consisting of liquid $SO_2$ and aqueous $SO_2$.

The overall range of impregnation stage pressures of the present invention preferably ranges from about atmospheric pressure to about 300 p.s.i.g.

The time of the impregnation stage is preferably within a range of between about 2 minutes and about 90 minutes. Generally speaking a lesser or shorter time is utilized with higher pressures, since it has been found that at the higher pressures stabilization of the hemicelluloses may be completed in a shorter time. If a time less than two minutes is utilized, then the impregnation may not be sufficiently complete to produce the desired products, whereas a time substantially exceeding 90 minutes will not offer further advantages.

It should be emphasized that the products resulting from this process also have, as set forth in the examples given hereafter, surprisingly high brightness.

The temperature range at which the present impregnation stage is carried out has also been found to be important, and preferably ranges from room temperature (such as about 16° C.) to about 80° C. Impregnation at 100° C. results in substantially lower brightness, and poorer delignification, as shown by the examples in Table 3. A preferred temperature range is from about 20° C. to about 50° C.

The following examples show various procedures within the above delineated parameters of the invention.

EXAMPLE 7

High yield, semichemical pulp.
Wood:
    White spruce (40%)
    Balsam (60%) 3.5 kg.
Impregnation liquor:
    $Na_2SO_3$ 62 g./l.
    NaOH 12 g./l.
Impregnation time, min.: 3
Impregnation pressure, p.s.i.g.: 200
Impregnation temperature: 50° C.
L:W (liquor:wood ratio) 4.9:1
pH 12.8
Chemical take up:
    $Na_2SO_3$ 325 g.
    NaOH 111 g.

The impregnation liquor was drained and an aqueous $SO_2$ solution was injected.
The following heating schedule was applied:

|  | Min. |
|---|---|
| Time to 120° C. | 3 |
| Time at 120° C. | 60 |
| Time at 155° C. | 5 |
| Time at 155° C. | 45 |
| Total time | 113 |

| | |
|---|---|
| pH after 1 hour | 2.6 |
| pH max. | 2.6 |
| Pulp yield | 74.1 |
| Bright. (Elr.) | 53 |
| Roe number | 27.3 |
| Fiberability, percent | 90.5 |

Strength properties at 500 CSF:
    Tear factor _____ 62
    Mullen, percent pts./lb. _____ 118
    Tensile strength, m. _____ 10,100

In studying the use of sulfite in the impregnation stage it was found possible to carry out this step at atmospheric pressure and still obtain satisfactory impregnation in a time short enough (5-10 min. minimum, varying somewhat with wood species used etc.) to permit continuous operation.

It may be mentioned that throughout our studies on alkaline pretreatment the penetration of cooking liquor as observed after splitting treated chips has been taken as an important criterion of impregnation. It was only recently found that penetration observed in this way need not be complete; it is sufficient if it has gone far enough that it is completed by the end of the cook.

The investigation of the use of sulfite in the alkaline impregnation step was carried out on woods (spruce and balsam) which, as mentioned above, are not benefited to a worthwhile degree by the presence of formaldehyde; it was accordingly not used in this case.

The following Example 8 illustrates the alkaline sulfite impregnation step carried out at atmospheric pressure and and followed by a bisulfite cook. It will be seen by comparison with foregoing examples that the properties of the product are normal for the alkaline impregnation-bisulfite process.

EXAMPLE 8

(High yield semichemical pulp)

Wood:
    White spruce (40%)
    Balsam (60%) 3.5 kg.
Impregnation liquor:
    $Na_2SO_3$ 79.4 g./l.
    NaOH 11.6 g./l.
Impregnation time:
    Min: 10
    Pressure, p.s.i.g.: atmospheric
    Temperature: 50° C.
L:W ratio 3.9:1
pH 12.6
Chemical take-up:
    $Na_2SO_3$ 365 g.
    NaOH 134 g.

The impregnation liquor was drained and an aqueous $SO_2$ solution was injected. The following heating schedule was applied:

|  | Min. |
|---|---|
| Time to 100° C. | 2 |
| Time at 100° C. | 60 |
| Time to 155° C. | 10 |
| Time at 155° C. | 55 |
| Total time | 127 |

| | |
|---|---|
| pH after 1 hour | [1] 2.7 |
| Pulp yield | 73.0 |
| Brightness, (Elr.) | 56.6 |
| Roe Number | 25.8 |
| Fiberability percent | 94.7 |

[1] pH max. 2.7.

For more positive pH control in continuous cooking the $SO_2$ injected into the digester may be replaced by a solution of bisulfite (containing excess $SO_2$). Part of this is made to flow countercurrently to the alkali treated chips, displacing alkali and leaving the chips impregnated with bisulfite. The alkalized bisulfite solution is withdrawn from the digester and regenerated with $SO_2$ in an absorption tower for subsequent reuse.

In Examples 9 to 16, impregnation and cooking of the wood was carried out in the same manner as in Example 7.

TABLE I

[60% balsam-40% spruce, from region A]

| Example | 9 | 10 | 11 |
|---|---|---|---|
| Impregnation: | | | |
| Liquor: | | | |
| Na₂CO₃, g./l. | | | 80.1 |
| Na₂SO₃, g./l. | | 79.4 | |
| NaOH, g./l. | 60.4 | 11.2 | 11.2 |
| pH | 14 | 12.5 | 12.9 |
| Temperature, °C | 50 | 50 | 50 |
| Pressure, p.s.i. | 200 | 200 | 200 |
| Time, minutes | 2 | 2 | 2 |
| Take-up: Total Na₂O, percent O.W. | 8.0 | 6.7 | 7.8 |
| Bisulfite cook: | | | |
| Time at 100° C., minutes | 60 | 60 | 60 |
| Time at 155° C., minutes | 55 | 70 | 75 |
| Pulp yield, percent | 71.8 | 70.1 | 71.3 |
| Roe number | 31.1 | 25.7 | 28.5 |
| Brightness | 43.1 | 52.9 | 51.9 |

Example 9 shows an undesirably high Roe number (high lignin content) and low brightness resulting form the high pH, compared with Examples 10 and 11.

TABLE II

[60% balsam-40% spruce, from region B]

| Example | 12 | 13 | 14 | 15 |
|---|---|---|---|---|
| Impregnation: | | | | |
| Liquor: | | | | |
| Na₂CO₃, g./l. | 94.9 | | 79.5 | 79.5 |
| Na₂SO₃, g./l. | | 85.7 | | |
| NaOH, g./l. | 11.2 | 11.2 | 11.6 | 11.2 |
| pH | 11.4 | 12.4 | 12.9 | 12.8 |
| Temperature, °C | 50 | 50 | 50 | 50 |
| Pressure, p.s.i. | 200 | 200 | 200 | 200 |
| Time, minutes | 2 | 2 | 2 | 2 |
| Take-up: Total Na₂O, percent O.W. | 8.2 | 12.2 | 9.9 | 8.5 |
| Bisulfite cook: | | | | |
| Time at 100° C., minutes | 60 | 60 | 60 | 60 |
| Time at 155° C., minutes | 45 | 60 | 72 | 60 |
| Pulp yield, percent | 68.1 | 76.7 | 69.2 | 74.8 |
| Roe number | 25.2 | 30.2 | 19.7 | 28.0 |
| Brightness | 56.0 | 54.9 | 58.2 | 55.5 |

Example 12 shows inferior results from operating well below the lower pH limit claimed herein, compared to Example 14, which has an equivalent yield. Similarly, Example 13 shows inferior results when compared to Example 15, the pH of Example 13 lying at the lower limit of the range while the pH of Example 15 lies near the top of the range.

TABLE III

[60% balsam-40% spruce, from region B]

| Example | 16 | 15 |
|---|---|---|
| Impregnation: | | |
| Liquor: | | |
| Na₂CO₃, g./l. | 81.6 | 79.5 |
| Na₂SO₃, g./l. | | |
| NaOH, g./l. | 10.8 | 11.2 |
| pH | 12.6 | 12.8 |
| Temperature, °C | 100 | 50 |
| Pressure, p.s.i. | 200 | 200 |
| Time, minutes | 2 | 2 |
| Take-up: Total Na₂O, percent O.W. | 9.4 | 8.5 |
| Bisulfite cook: | | |
| Time at 100° C., minutes | 60 | 60 |
| Time at 155° C., minutes | 80 | 60 |
| Pulp yield, percent | 74.1 | 74.8 |
| Roe number | 31.4 | 28.0 |
| Brightness | 45.6 | 55.5 |

Example 16 shows adverse effects resulting from high impregnation temperatures.

We claim:

1. A process for making pulps of increased pulp yield, high unbleached brightness and high fiberability from coniferous wood, comprising impregnating the wood with a formaldehyde-free alkaline solution of NaOH at a pH of from about 12.4 to about 13 and containing sulfite ion as a buffer, at a temperature within a range of between about 16° C. and about 80° C., and a pressure within a range of about atmospheric up to about 300 p.s.i.g., draining the solution from the wood, and adding sulfur dioxide so as to obtain a bisulfite cooking condition and thereafter cooking the so impregnated wood.

2. A process as in claim 1 wherein the pH of the impregnation stage is 12.6 to 12.9.

3. A process as in claim 1 wherein the pH of the impregnation stage is about 12.9.

4. A process as in claim 1 wherein the alkaline impregnation stage is carried out at atmospheric pressure, the temperature does not exceed about 50° C., and the time of impregnation is 2 to 90 minutes.

5. A process as in claim 1 wherein the pressure in the alkaline impregnation stage is an elevated pressure of at least about 200 p.s.i.g., the temperature does not exceed about 50° C., and the time of impregnation is about 3 minutes.

6. A process as in claim 1 wherein the steps of the process are carried out in a continuous manner.

7. A process as in claim 6 wherein the bisulfite cooking condition is carried out continuously in full or partial vapour phase in a digester, by introduction of liquid sulfur dioxide and steam into the digester.

References Cited

UNITED STATES PATENTS

| 1,848,662 | 3/1932 | Richter | 162—86 |
| 3,354,030 | 11/1967 | Williams et al. | 162—86 |
| 2,013,042 | 9/1935 | Foster | 162—90 X |
| 3,479,249 | 11/1969 | Kalisch | 162—72 X |
| 3,617,435 | 11/1971 | Kalisch | 162—72 |

S. LEON BASHORE, Primary Examiner

ARTHUR L. CORBIN, Assistant Examiner